(12) United States Patent
Ghoneim et al.

(10) Patent No.: US 12,479,498 B2
(45) Date of Patent: Nov. 25, 2025

(54) CONTROL METHOD AND APPARATUS

(71) Applicant: GREAT WALL MOTOR COMPANY LIMITED, Baoding (CN)

(72) Inventors: Youssef Ahmed Ghoneim, Baoding (CN); Yu Sun, Baoding (CN); Xiaofeng Niu, Baoding (CN); Yingfu Zhang, Baoding (CN); Bo Xu, Baoding (CN); Binbin Wang, Baoding (CN); Jianhong Chen, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 537 days.

(21) Appl. No.: 17/923,684

(22) PCT Filed: May 17, 2021

(86) PCT No.: PCT/CN2021/094200
§ 371 (c)(1),
(2) Date: Nov. 7, 2022

(87) PCT Pub. No.: WO2021/233265
PCT Pub. Date: Nov. 25, 2021

(65) Prior Publication Data
US 2023/0174143 A1 Jun. 8, 2023

(30) Foreign Application Priority Data
May 18, 2020 (CN) .......................... 202010421043.2

(51) Int. Cl.
*B62D 5/04* (2006.01)
*B62D 6/00* (2006.01)
*B62D 15/02* (2006.01)

(52) U.S. Cl.
CPC .......... *B62D 5/0463* (2013.01); *B62D 6/003* (2013.01); *B62D 15/021* (2013.01)

(58) Field of Classification Search
CPC ..... B62D 5/0463; B62D 6/003; B62D 15/021
(Continued)

(56) References Cited

U.S. PATENT DOCUMENTS 8,150,582 B2 * 4/2012 Blommer ............. B62D 5/0472
701/44
9,272,732 B2 * 3/2016 Greul ................. B62D 15/0225
(Continued)

FOREIGN PATENT DOCUMENTS

CN 108622094 A 10/2018
CN 108995652 A 12/2018
(Continued)

OTHER PUBLICATIONS

PCT/CN2021/094200 international search report.
(Continued)

*Primary Examiner* — Valentin Neacsu
*Assistant Examiner* — Michael R Stabley
(74) *Attorney, Agent, or Firm* — IPro, PLLC

(57) ABSTRACT

A control method and apparatus, which are applied to a vehicle with an electric power steering system. The electric power steering system comprises a first control subsystem and a second control subsystem. The method comprises: acquiring a front steering angle, a steering torque, a yaw rate and a vehicle speed of a vehicle; according to the front steering angle, the steering torque, the yaw rate and the vehicle speed, determining a vehicle yaw rate associated with a first control subsystem; determining, on the basis of the vehicle yaw rate, an expected deviation value associated with a second control subsystem; and determining a control parameter on the basis of the expected deviation value, such that the vehicle adjusts, according to the control parameter, the steering torque to run.

11 Claims, 8 Drawing Sheets

(58) Field of Classification Search
USPC .......................................................... 180/443
See application file for complete search history.

(56) References Cited

U.S. PATENT DOCUMENTS

| | | | |
|---|---|---|---|
| 10,053,143 B2 | 8/2018 | Wang et al. | |
| 10,248,124 B2* | 4/2019 | Bellaiche | G01C 21/3658 |
| 10,538,270 B2* | 1/2020 | Tatsukawa | B62D 15/025 |
| 10,744,875 B2* | 8/2020 | Komatsubara | B60K 23/04 |
| 2006/0142921 A1* | 6/2006 | Takeda | B60W 30/12 |
| | | | 701/70 |
| 2010/0228437 A1* | 9/2010 | Hanzawa | B62D 15/025 |
| | | | 382/199 |
| 2018/0154937 A1 | 6/2018 | Tatsukawa | |
| 2019/0299777 A1* | 10/2019 | Komatsubara | B60K 23/04 |

FOREIGN PATENT DOCUMENTS

| | | |
|---|---|---|
| CN | 110040126 A | 7/2019 |
| CN | 111645755 A | 9/2020 |
| DE | 102017125847 A1 | 5/2018 |
| IN | 110023127 A | 7/2019 |
| JP | 2009286279 A | 12/2009 |
| KR | 20170082355 A | 7/2017 |
| WO | 2019188951 A1 | 10/2019 |

OTHER PUBLICATIONS

CN202010421043.2 first office action and search report.
EP 21808610.6 Extended European search report dated Dec. 13, 2023.

* cited by examiner

CONTROL METHOD AND APPARATUS

CROSS-REFERENCE TO RELATED APPLICATIONS

This application is a national phase of PCT application No. PCT/CN2021/094200, filed on May 17, 2021, which claims the priority of the Chinese patent application filed on May 18, 2020 before the CNIPA, China National Intellectual Property Administration with the application No. 202010421043.2 and the title of "CONTROL METHOD AND APPARATUS", which is incorporated herein in its entirety by reference.

TECHNICAL FIELD

The present disclosure relates to the technical field of vehicle control, and more particularly, to a control method and an apparatus.

BACKGROUND

With the gradual development of the technical field of vehicle control, the performance of active control subsystem in vehicles is gradually improving, and an active control subsystem can enhance the comfort and safety of a driver.

Currently, the active control subsystem mainly includes an electronic stability control (ESC) system. The ESC system typically senses wheel slip based on relevant parameter inputs from wheel speed sensors, steering angle sensors, vehicle speed sensors, and yaw rate sensors, and the ESC system uses the relevant parameter inputs to reduce the engine torque and apply vehicle braking to help to keep the vehicle on a predetermined path, so as to assist the vehicle driver in driving on wet or rough road surfaces (such as ice, snow, gravel, or like road surfaces).

However, in severe road surface conditions, such as overly wet or rugged road surfaces, the ESC system may employ larger braking operations to substantially reduce the vehicle speed, resulting in reduced tire life.

SUMMARY

In view of the foregoing, the present disclosure is directed to a control method and apparatus that addresses the problem that the current ESC system may employ great braking operations to substantially reduce the vehicle speed which results in reduced tire life.

In order to achieve the above object, the technical solution of the present disclosure is achieved as follows.

In the first aspect, an embodiment of the present disclosure provides a control method being applied to a vehicle having an electric power steering system, wherein the electric power steering system includes a first control subsystem and a second control subsystem, the method comprising:

acquiring a front steering angle, a steering torque, a yaw rate, and a vehicle speed of a vehicle;

determining a vehicle yaw rate associated with the first control subsystem according to the front steering angle, the steering torque, the yaw rate, and the vehicle speed;

determining an expected deviation value associated with the second control subsystem on the basis of the vehicle yaw rate; and determining a control parameter on the basis of the expected deviation value such that the vehicle adjusts the steering torque to run according to the control parameter.

Optionally, determining a control parameter on the basis of the expected deviation value such that the vehicle adjusts, according to the control parameter, the steering torque to run includes:

when the expected deviation value is within a first preset range, determining a steering angle feedforward control parameter such that the vehicle runs by adjusting the steering torque according to the steering angle feedforward control parameter.

Optionally, determining a control parameter on the basis of the expected deviation value such that the vehicle adjusts, according to the control parameter, the steering torque to run includes:

when the expected deviation value is within a second preset range, determining a steering angle feedback control parameter such that the vehicle runs by adjusting the steering torque according to the steering angle feedback control parameter.

Optionally, when the expected deviation value is within a first preset range, determining a steering angle feedforward control parameter such that the vehicle runs by adjusting the steering torque according to the steering angle feedforward control parameter includes:

acquiring a proportional gain of a proportional gain function when the expected deviation value is within the first preset range; and determining the steering angle feedforward control parameter based on a product of the proportional gain and the steering torque such that the vehicle runs by adjusting the steering torque according to the steering angle feedforward control parameter.

Optionally, when the expected deviation value is within a second preset range, determining a steering angle feedback control parameter to cause the vehicle to run by adjusting the steering torque according to the steering angle feedback control parameter includes:

acquiring a proportional derivative gain of a proportional-derivative function when the expected deviation value is within the second preset range; and determining a steering angle feedback control parameter based on the proportional derivative gain such that the vehicle runs by adjusting the steering torque according to the steering angle feedback control parameter.

In the second aspect, an embodiment of the present disclosure provides a control apparatus being applied to a vehicle having an electric power steering system, wherein the electric power steering system includes a first control subsystem and a second control subsystem, the apparatus comprising:

an acquisition module configured for, acquiring a front steering angle, a steering torque, a yaw rate, and a vehicle speed of the vehicle;

a first determination module configured for, determining a vehicle yaw rate associated with the first control subsystem according to the front steering angle, the steering torque, the yaw rate, and the vehicle speed;

a second determination module configured for, determining an expected deviation value associated with the second control subsystem on the basis of the vehicle yaw rate; and a third determination module configured for, determining a control parameter on the basis of the expected deviation value such that the vehicle adjusts the steering torque to run according to the control parameter.

Optionally, the third determination module includes:

a first determination sub-module configured for, when the expected deviation value is within a first preset range, determining a steering angle feedforward control parameter such that the vehicle runs by adjusting the steering torque according to the steering angle feedforward control parameter.

Optionally, the third determination sub-module includes:

a second determination sub-module configured for, when the expected deviation value is within a second preset range, determining a steering angle feedback control parameter such that the vehicle runs by adjusting the steering torque according to the steering angle feedback control parameter.

Optionally, the first determination sub-module includes:

a first acquisition unit configured for, acquiring a proportional gain of a proportional gain function when an expected deviation value is within the first preset range; and a first determination unit configured for, determining the steering angle feedforward control parameter according to a product of the proportional gain and the steering torque.

Optionally, the second determination sub-module includes:

a second acquisition unit configured for, acquiring a proportional derivative gain of a proportional-derivative function when the expected deviation value is within a second preset range; and a second determination unit configured for, determining a steering angle feedback control parameter based on the proportional derivative gain such that the vehicle runs by adjusting the steering torque according to the steering angle feedback control parameter.

The embodiments of the present disclosure have the following advantages over the prior art.

According to a control method provided by an embodiment of the disclosure, a vehicle with an electric power steering system acquires a front steering angle, steering torque, yaw rate, and vehicle speed of the vehicle, and determines a vehicle yaw rate associated with the first control subsystem according to the front steering angle, steering torque, yaw rate, and vehicle speed, and determines the expected deviation value associated with the second control subsystem based on the vehicle yaw rate, and determines a control parameter based on the expected deviation value, so that the vehicle runs by adjusting the steering torque according to the control parameter. Therefore, for severe road surface conditions, such as overly wet or rugged road surface, the electric power steering system can control the vehicle to adjust the steering torque according to the control parameter, thereby enhancing the overall vehicle handling characteristic of the vehicle, avoiding using a relatively large braking operation to greatly reduce the speed of the vehicle, and avoiding the situation of shortening the service life of tires.

The above description is only an overview of the technical solutions of the present disclosure. In order to understand the technical means of the present disclosure more clearly, the implementation can be made according to the contents of the description. In order to make the above and other purposes, features, and advantages of the present disclosure more obvious and easier to understand, preferred embodiments of the present disclosure are listed below.

BRIEF DESCRIPTION OF THE DRAWINGS

In order to explain the embodiments of the present disclosure or the technical solutions in the related art more clearly, a brief description will be given below with reference to the accompanying drawings which are used in the description of the embodiments or the related art; obviously, the drawings in the description below are some embodiments of the present disclosure, and for those of ordinary skills in the art, other drawings can also be obtained from these drawings without creative efforts.

The accompanying drawings constituting a part of the present disclosure are used to provide a further understanding of the present disclosure. The schematic embodiments of the present disclosure and descriptions thereof are used to explain the present disclosure and do not constitute an improper limitation of the present disclosure. In the drawings.

DETAILED DESCRIPTION OF THE EMBODIMENTS

Figure 1:
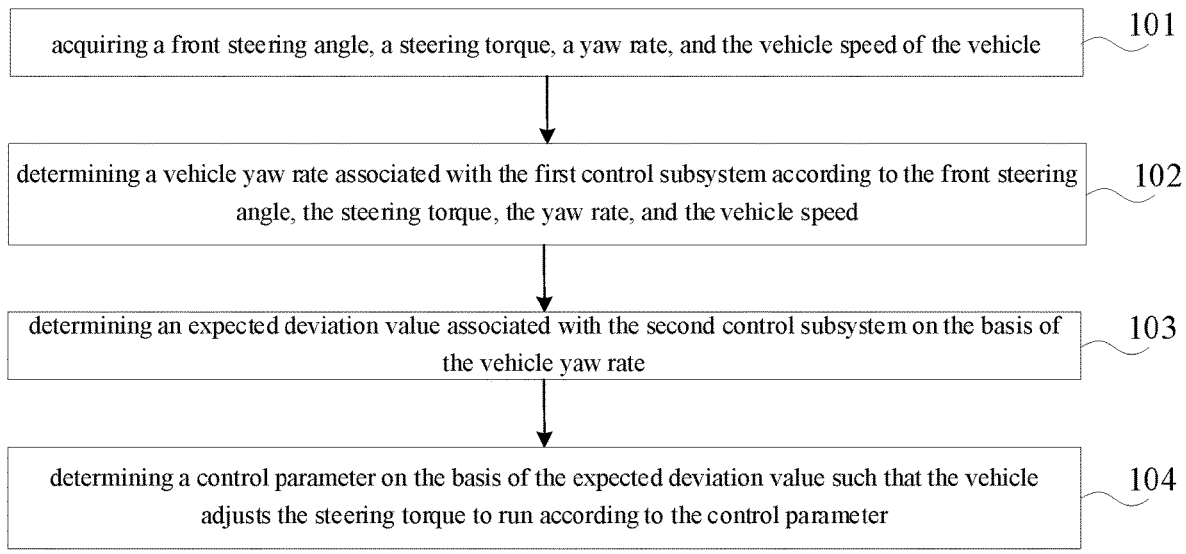
FIG. 1 is a flowchart showing the steps of a control method provided in a first embodiment of the present disclosure.

In order to make the purposes, technical solutions, and advantages of the embodiments of the present disclosure clearer, the technical solutions in the embodiments of the present disclosure will be clearly and completely described below with reference to the accompanying drawings in the embodiments of the present disclosure. Obviously, the described embodiments are some, but not all, of the embodiments of the present disclosure. Based on the embodiments in the present disclosure, all other embodiments obtained by a person of ordinary skills in the art without inventive efforts fall within the scope of the present disclosure.

It needs to be noted that embodiments and features of embodiments in the present disclosure may be combined with each other without conflict.

An electric power steering (EPS) system is an intelligent actuator that overlays the electronic control of auxiliary torque to provide a vehicle steering system. The primary purpose of the EPS system is to provide comfort to the driver by increasing the torque. However, recent developments indicate that the EPS system can also be used to enhance vehicle stability.

The EPS system accomplishes steering torque overlay by being mounted on a steering column, a rack, or a pinion in combination with a motor. The primary function of the EPS system is to provide electric power steering to allow the driver to drive the steering wheel more easily so as to improve driving comfort. The steering assist provided by the EPS system is that the volume of the auxiliary torque is proportional to the driver's steering torque input. The volume of the auxiliary torque is calculated through a characteristic curve. In addition, the EPS system may be designed such that the motor provides different steering torques under various driving conditions to improve steering feel, vehicle stability, or steerability. Some of the functions of the widely used EPS system are described below.

Transmitting variable steering torque as a function of the vehicle speed is one of the basic assisting functions of the EPS system. To reduce the volume of steering power provided when increasing the vehicle speed, the basic EPS system acceleration curve is extended to accommodate the vehicle speed, and the acceleration curve is used as an additional input to the steering torque query table. This will increase the damping of the vehicle, helping the driver to maintain smooth control of the vehicle in case of high-speed maneuvers.

Vehicle networking communication protocols provide opportunities for data exchange between the EPS system and other existing vehicle dynamics systems. Therefore, not only the parameters such as speed, steering angle, and steering torque can be used, but also other existing vehicle dynamics sensors (such as yaw rate sensors) can be considered such that the ideal volume of auxiliary torque in a particular operating condition can be determined. During the understeer of the vehicle, the known EPS system provides additional steering torque based on the difference value between the ideal yaw angle defined by the driver's steering input and the actual yaw angle of the vehicle, thereby an additional torque is put on the front wheel of the vehicle, which may saturate the volume of torque borne by the front wheel, resulting in decreased overall vehicle performance.

The present disclosure will be described below in detail in connection with embodiments with reference to the accompanying drawings.

Referring to FIG. 1, a flowchart of the steps of a control method is provided in a first embodiment of the present disclosure. The control method can be applied to a vehicle provided with an electric power steering system including a first control subsystem and a second control subsystem.

As shown in FIG. 1, the control method may specifically include the following steps.

Step 101: acquiring a front steering angle, a steering torque, a yaw rate, and the vehicle speed of the vehicle.

In the present disclosure, an electric power steering system may include: a front steering angle sensor used to measure the front steering angle of the vehicle; a steering torque sensor used to measure a steering torque of a driver; and a yaw rate sensor used to measure a yaw rate of the vehicle; the electric power steering system further includes: a speed sensor that can be used to measure the vehicle speed, and a controller that includes an instruction. When the processor executes this instruction, the processor may be caused to determine a first control subsystem providing a feedforward control and a second control subsystem providing a feedback control to control the angle of the front wheel and the vehicle steering torque by changing the angle of the front wheel.

After acquiring the front steering angle, the steering torque, the yaw rate, and the vehicle speed of the vehicle, step 102 is executed.

Step 102: determining a vehicle yaw rate associated with the first control subsystem according to the front steering angle, the steering torque, the yaw rate, and the vehicle speed.

In the present disclosure, the controller determines a vehicle yaw rate associated with the first control subsystem according to the front steering angle, the steering torque, the yaw rate, and the vehicle speed.

After determining a vehicle yaw rate associated with a first control subsystem according to the front steering angle, the steering torque, the yaw rate, and the vehicle speed, step 103 is executed.

Step 103: determining an expected deviation value associated with the second control subsystem on the basis of the vehicle yaw rate.

In the present disclosure, the controller determines an expected deviation value associated with the second control subsystem for the yaw rate according to the vehicle yaw rate.

After determining an expected deviation value associated with the second control subsystem according to the vehicle yaw rate, step 104 is executed.

Step 104: determining a control parameter on the basis of the expected deviation value such that the vehicle adjusts the steering torque to run according to the control parameter.

Optionally, when the expected deviation value is within the first preset range, a steering angle feedforward control parameter is determined such that the vehicle runs by adjusting the steering torque according to the steering angle feedforward control parameter.

Specifically, acquiring a proportional gain of the proportional gain function when the expected deviation value is within a first preset range; a steering angle feedforward control parameter is determined based on the product of the proportional gain and the steering torque such that the vehicle runs by adjusting the steering torque according to the steering angle feedforward control parameter.

Optionally, when the expected deviation value is within the second preset range, a steering angle feedback control parameter is determined to cause the vehicle to run by adjusting the steering torque according to the steering angle feedback control parameter.

Specifically, acquiring a proportional derivative gain of the proportional-derivative function when the expected deviation value is within the second preset range; and determining a steering angle feedback control parameter based on the proportional derivative gain such that the vehicle runs by adjusting the steering torque according to the steering angle feedback control parameter. A proportional term is determined by multiplying the proportional gain by the yaw rate error signal and the derivative term is determined by multiplying the derivative gain by the yaw acceleration error signal, the yaw rate error signal being obtainable from the yaw rate and the yaw acceleration error signal being obtainable from the vehicle speed.

According to a control method provided by an embodiment of the disclosure, a vehicle with an electric power steering system acquires a front steering angle, steering torque, yaw rate, and vehicle speed of the vehicle, and determines a vehicle yaw rate associated with the first control subsystem according to the front steering angle, steering torque, yaw rate, and vehicle speed, and determines the expected deviation value associated with the second control subsystem based on the vehicle yaw rate, and determines a control parameter based on the expected deviation value, so that the vehicle runs by adjusting the steering torque according to the control parameter. Therefore, for severe road surface conditions, such as overly wet or rugged road surface, the electric power steering system can control the vehicle to adjust the steering torque according to the control parameter, thereby enhancing the overall vehicle handling characteristic of the vehicle, avoiding using a relatively large braking operation to greatly reduce the speed of the vehicle, and avoiding the situation of shortening the service life of tires.

Figure 2:
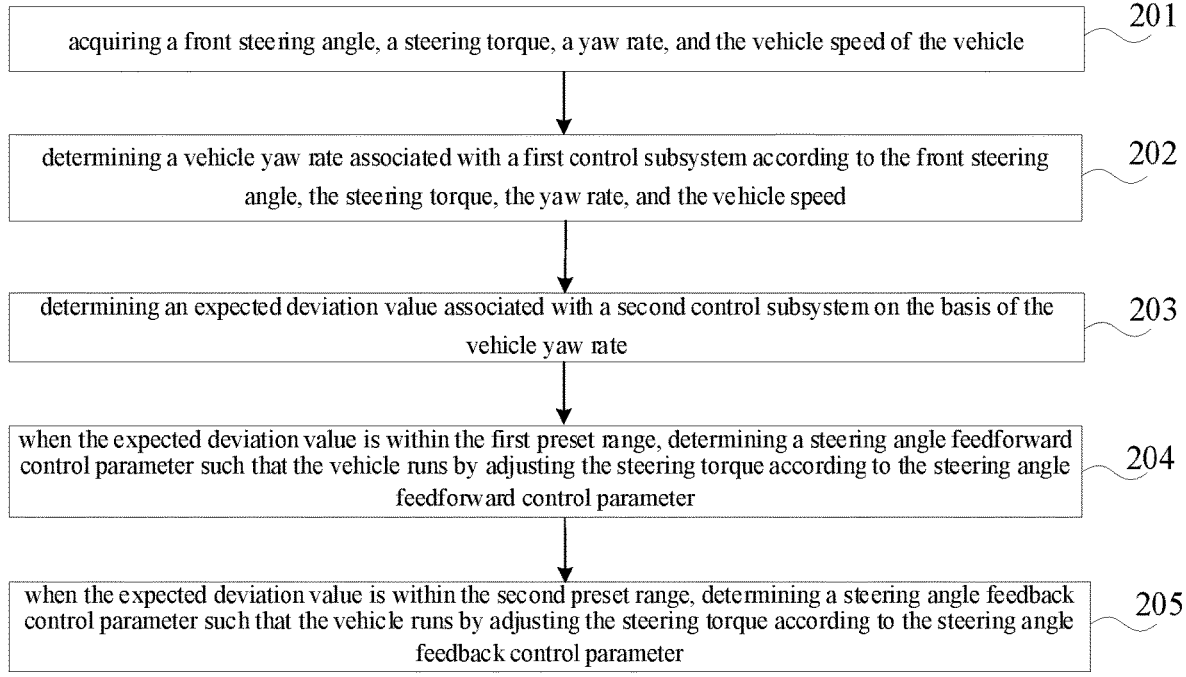
FIG. 2 is a flowchart showing the steps of a control method provided in a second embodiment of the present disclosure.

Referring to FIG. 2, a flowchart showing the steps of a control method is provided in a second embodiment of the present disclosure. The control method can be applied to a vehicle with an electric power steering system including a first control subsystem and a second control subsystem.

As shown in FIG. 2, the control method may specifically include the following steps.

Step 201: acquiring a front steering angle, a steering torque, a yaw rate, and the vehicle speed of the vehicle.

In the present disclosure, an electric power steering system may include: a front steering angle sensor used to measure the front steering angle of the vehicle; a steering torque sensor used to measure a steering torque of a driver; and a yaw rate sensor used to measure a yaw rate of the vehicle; the electric power steering system further includes: a speed sensor that can be used to measure the vehicle speed, and a controller that includes an instruction. When the processor executes this instruction, the processor may be caused to determine a first control subsystem providing a feedforward control and a second control subsystem providing a feedback control to control the angle of the front wheel and the vehicle steering torque by changing the angle of the front wheel.

The electric power system is provided with a feedforward control function and a feedback control function for controlling the angle of the front wheels to correct the vehicle steering torque to restore vehicle stability. Based on vehicle stability conditions, the increased steering torque will be the same as or opposite to the driver-input torque.

The electric power steering (EPS) system of the present disclosure may provide additional feedforward control for the EPS system based on the steering torque input by the driver and adjust the feedback/feedforward control based on the degree of understeer/oversteer of the vehicle.

Figure 3:
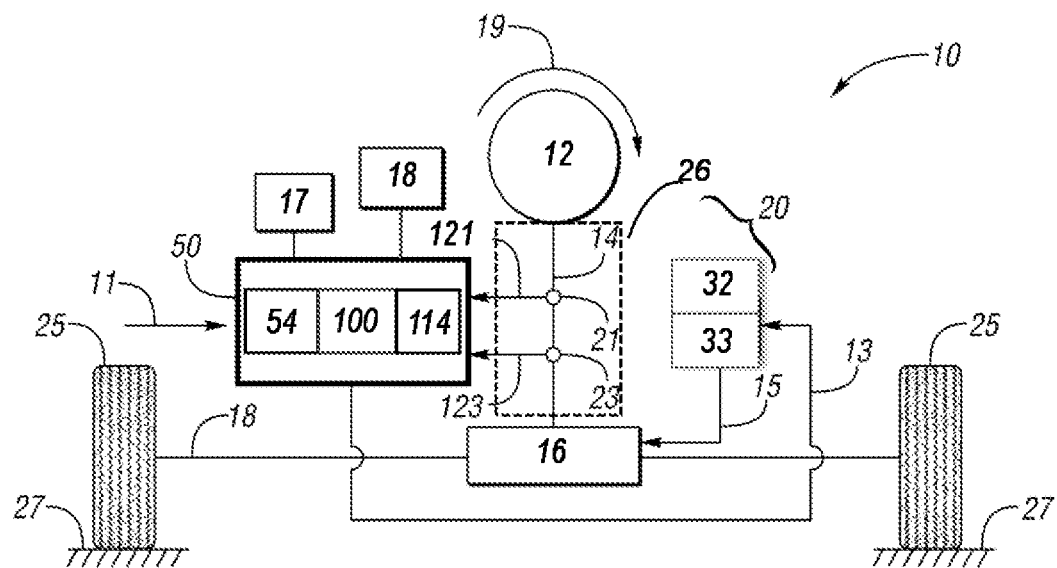
FIG. 3 illustrates a schematic diagram of a vehicle having an electric power steering system provided by an embodiment of the present disclosure.

FIG. 3 shows a schematic diagram of a vehicle provided with an electric power steering system provided by an embodiment of the present disclosure. As shown in FIG. 3, the vehicle 10 includes an electric power steering (EPS) system 20 mounted on a steering column, and a controller 50. The controller 50 is shown schematically as a single unit, but the various elements of the controller 50 may be distributed over a number of special uses. The controller may include an electronic control unit, such as a motor control unit, a steering control unit, etc. In the present disclosure, the controller 50 is configured for a steering torque overlay (STO) system with feedforward and feedback control. The feedforward and feedback control are used to control the angle of the front wheel to restore the stability of the vehicle.

Referring to FIG. 3, the vehicle 10 also includes a steering wheel 12 that rotates in response to a steering torque input by the driver, the steering wheel 12 being connectable to a steering column 14 that is connected to a steering mechanism 16. The steering mechanism 16 is a rack and pinion assembly, and may be other steering assemblies, which are not particularly limited by the embodiments of the disclosure. The steering assembly 26 and steering mechanism 16 may ultimately orient the front wheel 25 relative to the road surface 27 by moving a pull rod 18 on a set of front axles.

The torque sensor 23 and the steering wheel angle sensor 21 may be fixedly arranged relative to the steering column 14. The torque sensor 23 measures a torque sensor signal (arrow 123) and transmits the torque sensor signal to the controller 50. Similarly, the steering wheel angle sensor 21 measures a steering wheel angle signal (arrow 121) and transmits the steering wheel angle signal to controller 50. The controller 50 processes the torque sensor signal, the steering wheel angle signal, and other vehicle operating data (arrow 11), such as vehicle speed, yaw rate, mass, etc. to determine the volume of steering torque required by the steering motor 32 to direct to the current steering operation. The controller 50 communicates (arrow 13) with the steering motor 32 via a motor control signal. The steering motor 32 generates and transmits motor torque (arrow 15) through the decelerating gear set 33 to the steering mechanism 16 in response to a motor control signal (arrow 13). The torque (Torque Driver, TD) applied by the driver of the vehicle 10, i.e. TD, under the torque auxiliary (TA) from the EPS system 20, should overcome two reaction torques when the vehicle 10 is steered: the self-aligning torque generated by the tire 25 and road surface 27, as well as the torque generated by the Coulomb friction and viscous friction of the EPS system 20 itself.

As shown in FIG. 3, the controller 50 may transmit a motor control signal (arrow 13) to a steering motor 32 by using a controller local area network, serial bus, data router, and/or other suitable network connections. The hardware assemblies of the controller 50 may include one or more digital computers, each including a microprocessor or central processing unit (CPU), a read-only memory (ROM), a random-access memory (RAM), an electrically programmable read-only memory (EPROM), a high-speed clock, analog-to-digital (A/D) and digital-to-analog (D/A) circuit, an input/output circuit and device (I/O), and appropriate signal conditioning and buffering circuit.

After acquiring the front steering angle, the steering torque, the yaw rate, and the vehicle speed of the vehicle, step 202 is executed.

Step 202: determining a vehicle yaw rate associated with a first control subsystem according to the front steering angle, the steering torque, the yaw rate, and the vehicle speed.

In the present disclosure, the controller determines a vehicle yaw rate associated with the first control subsystem according to the front steering angle, the steering torque, the yaw rate and the vehicle speed.

In an embodiment of the present disclosure, a sensor module 54 provided within the controller 50 may be used to execute the signal required by the control algorithm module 100 of the present disclosure.

Figure 4:
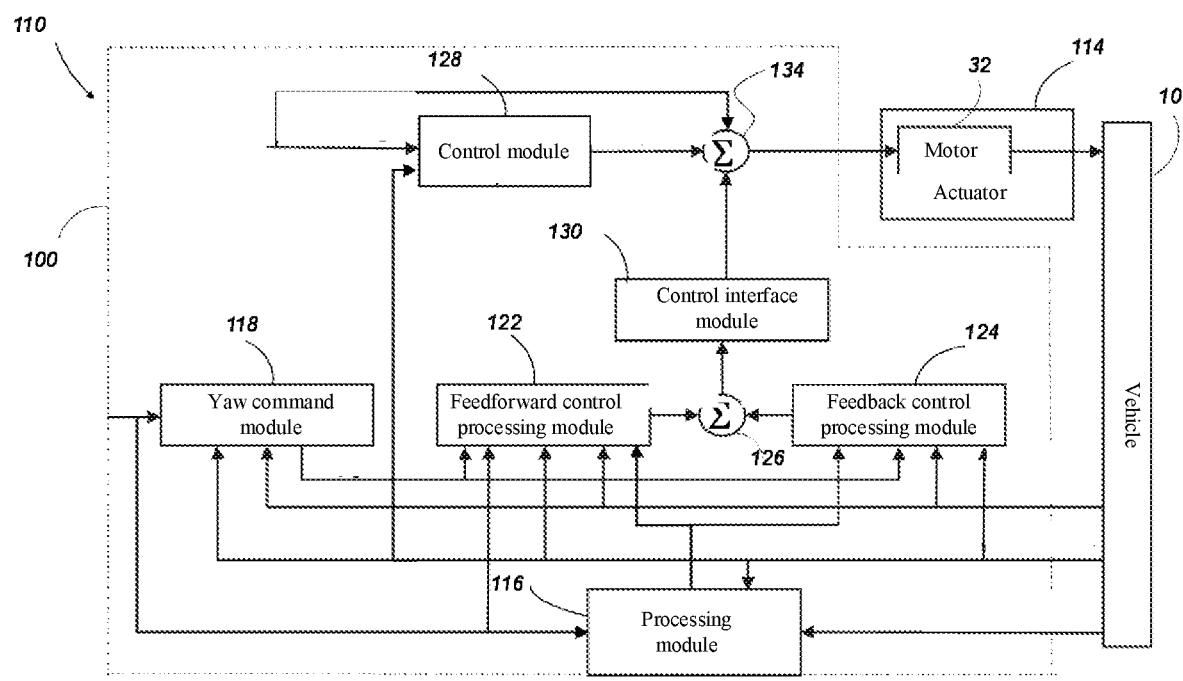
FIG. 4 illustrates a schematic diagram of an electric power steering system provided by an embodiment of the present disclosure.

FIG. 4 shows a schematic diagram of an electric power steering system provided by an embodiment of the present disclosure. As shown in FIG. 4, the EPS system 110 includes an actuator 114 and a control algorithm module 100. The actuator 114 receives, from the control module 128, the steering torque auxiliary request from the processing module 116, the torque (Torque Driver, TD) applied by the driver, and the torque overlay control request, and superimposes the auxiliary torque with the electronic control torque of the steering system of the vehicle 10, so that the vehicle 10 steers.

The control algorithm module 100 includes an understeer behavior processing module 116 and a yaw rate command processing module 118, both of which receive a driver steering signal. The vehicle 10 includes a yaw rate sensor for measuring a yaw rate of the vehicle 10, a vehicle speed sensor for determining the vehicle speed of the vehicle 10, and a lateral acceleration sensor for measuring the lateral acceleration of the vehicle 10. The understeer behavior processing module 116 also receives the vehicle speed signal, the driver steering angle, and a lateral acceleration signal, and generates an understeer behavior indicator.

After determining a vehicle yaw rate associated with a first control subsystem according to the front steering angle, the steering torque, the yaw rate, and the vehicle speed, step 203 is executed.

Step 203: determining an expected deviation value associated with a second control subsystem on the basis of the vehicle yaw rate.

In the present disclosure, the controller determines an expected deviation value associated with the second control subsystem for the yaw rate according to the vehicle yaw rate.

After determining an expected deviation value associated with the second control subsystem according to the vehicle yaw rate, step 204 is executed.

Step 204: when the expected deviation value is within the first preset range, determining a steering angle feedforward control parameter such that the vehicle runs by adjusting the steering torque according to the steering angle feedforward control parameter.

Referring to FIG. 4, the yaw rate command processing module 118 may also receive a vehicle speed signal and a driver steering angle and generate a yaw rate command signal. The feedforward control processing module 122 receives a driver steering angle and a yaw rate command signal from the yaw rate command processing module 118. The vehicle speed signal, the yaw rate command signal, and the understeer behavior indicator come from the understeer behavior processing module 116 and generate a feedforward control signal ΔδFF. Similarly, the feedback control processing module 124 receives the yaw rate command signal, the vehicle yaw rate signal, the vehicle speed signal, and the understeer behavior indicator from the understeer behavior processing module 116 and generates the feedback control signal ΔδFB.

The feedforward control signal ΔδFF and the feedback control signal ΔδFB are added together to provide a steering request signal Δδc. The control interface module 130 converts the steering request signal Δδc to a torque overlay control request signal. The torque overlay control request signal, the driver steering torque (TD), and the torque auxiliary request (TA) are calculated via the characteristic curve, and are applied to the summer 134 to provide the electric steering torque command signal. The electric steering torque command signal is applied to the motor 32 in the actuator 114, the motor 32 generating a steering torque signal that is applied to the vehicle steering apparatus.

Specifically, acquiring a proportional gain of the proportional gain function when the expected deviation value is within a first preset range as the vehicle being indicated as understeer; a steering angle feedforward control parameter is determined based on the product of the proportional gain and the steering torque such that the vehicle runs by adjusting the steering torque according to the steering angle feedforward control parameter.

The present disclosure uses two degree of freedom models to determine vehicle understeer behavior and vehicle yaw correction moment for EPS system stability enhancement.

During the operation of the vehicle 10, the vehicle not only undergoes yawing motion, but also undergoes lateral motion at the same time. The yaw plane dynamics determines the performance of vehicle yawing motion characterized by vehicle yaw speed and of the lateral motion characterized by the lateral speed.

The following terms will be used in the following expressions and formulas:

a is the distance (meter, m) from the center of gravity of the vehicle 10 to the front axle;
b is the distance (meter, m) from the center of gravity of the vehicle 10 to the rear axle;
L is the wheelbase (meter, m) of the vehicle 10, (L=a+b);
Cf is the cornering stiffness (N/rad) of the two tires of the front axle;
Cr is the cornering stiffness (N/rad) of the two tires of the rear axle;
Cf0 is the nominal cornering stiffness (N/rad) of the two tires of the front axle;
Cr0 is the nominal cornering stiffness (N/rad) of the two tires of the rear axle;
Iz is the moment of inertia (kgm$^2$) of the vehicle 10 about the yaw axis;
M is the total mass of the vehicle (kilogram, kg);
vy is the lateral speed (m/s) of the vehicle's center of gravity;
vyd is the required lateral speed (m/s) of the center of gravity of the vehicle;
vx is the longitudinal speed (m/s) of the center of gravity of the vehicle;
δ is the steering angle (radian, rad) input by the driver;
Ng is the steering gear ratio;
δf is the steering angle of the front wheel (radian, rad)= δ/Ng;
ay is the lateral acceleration (m/sec$^2$) of the vehicle 10;
Ku is an understeer behavior indicator (rad/g) of the vehicle 10;
$\dot{\psi}$ is the yaw rate (rad/s) of the vehicle 10;
$\dot{\psi}_c$ is the desired commanded yaw rate (rad/s) of the vehicle 10.

The vehicle yaw plane dynamics can be described by a second order state equation as:

$$Ma_y = M(\dot{v}_y + v_x\dot{\psi}) = F_{yf} + F_{yr} \quad (1);$$

$$Ma_y = M(\dot{v}_y + v_x\dot{\psi}) = F_{yf} + F_{yr} \quad (2);$$

wherein, $$F_{yf} = C_f \alpha_f \quad (3);$$

$$F_{yr} = C_r \alpha_r \quad (4);$$

the front slip angle and the rear slip angle follow the following relationship:

$$\alpha_f = \delta_f - \frac{v_y + a\dot{\psi}}{v_x}; \quad (5)$$

$$\alpha_r = \frac{v_y + b\dot{\psi}}{v_x}; \quad (6)$$

under steady-state conditions, the following general steering equation can be derived from the yaw plane model described in equations (1), (2), (3), (4), (5), and (6):

$$\delta_f = \frac{L\dot{\psi}}{v_x} + K_u a_y \quad (7)$$

$$K_u = \frac{M(bC_r - aC_f)}{LC_f C_r}.$$

Under steady-state conditions, the equation (7) is valid in the linear range of tire performance when the lateral force generated by the tire is proportional to the tire slip angle.

Under non-linear tire behavior or transient-state conditions, the general steering equation becomes inaccurate and the understeer-oversteer behavior indicator cannot be determined by using the mathematical expression. Therefore, an understeer behavior indicator needs to be determined.

Figure 5:
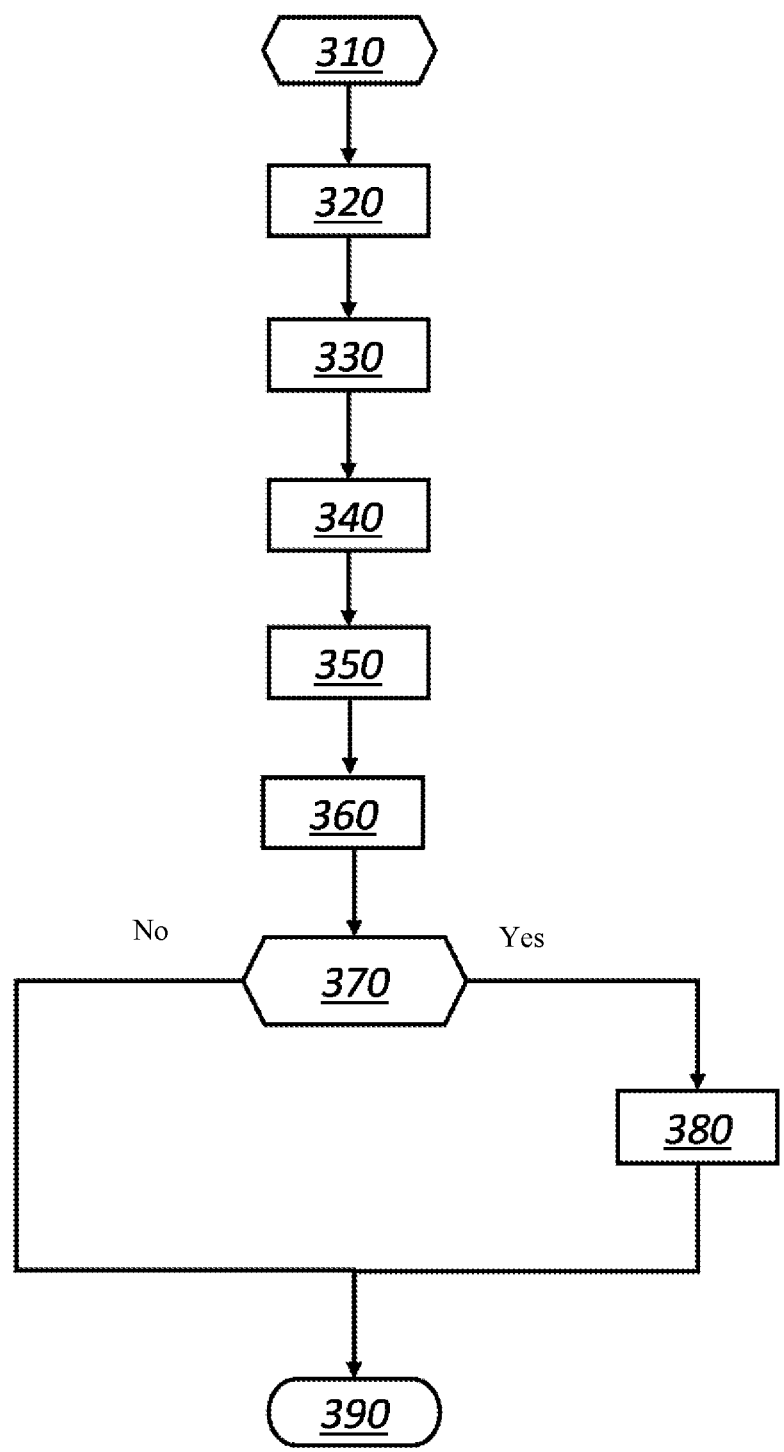
FIG. 5 illustrates a schematic diagram of a calculated and estimated behavior indicator provided by an embodiment of the present disclosure.

FIG. 5 illustrates a schematic diagram of a calculated and estimated behavior indicator provided by an embodiment of the present disclosure. Table 1 is provided as a keyword, wherein corresponding to the process for calculating an estimated steering, a numerically labeled block, and the corresponding function as described below and correspond to the process for calculating an estimated steering behavior indicator (116).

TABLE 1

| Sequence number of steps | The content of a step |
|---|---|
| 310 | Start the routine<br>$P(0) = P_{init} > 0$ (e.g., 100)<br>$\alpha(0) = 1$ |
| 320 | The general steering equation is reset as:<br>$K_u v_x \alpha_y = \delta_f v_x - L\dot{\psi}$     (8) |
| 330 | The following variables are calculated as follows:<br>$\gamma = \delta_f v_x - L\dot{\psi}$     (9)<br>$\xi = \alpha_y v_x$<br>$\gamma = \xi K_u$     (10) |
| 340 | At each fixed interval k, the estimated error is calculated as follows:<br>$\varepsilon(k) = \gamma(k) - \xi(k-1)\hat{K}_\mu(k-1)$     (11)<br>where, $\hat{K}_\mu(k-1)$ is when $k-1$, the estimated understeer behavior indica |
| 350 | The estimated understeer behavior indicator is updated by using recursive least squares as follows:<br><br>$$\left. \begin{array}{l} \hat{K}_u(k) = \hat{K}_u(k-1) + \dfrac{P(k-2)\xi(k-1)}{\alpha(k-1) + \xi^2(k-1)P(k-2)}\varepsilon(k) \\ P(k-1) \text{ is updated by the following formulas:} \\ P(k-1) = \dfrac{1}{\alpha(k-1)}\left[ P(k-2) - \dfrac{P^2(k-2)\xi^2(k-1)}{\alpha(k-1) + \xi^2(k-1)P(k-2)} \right] \\ \alpha(k) = 1 - \alpha'\dfrac{\varepsilon^2(k)}{1 + \xi^2(k-1)P(k-2)},\ \alpha' < 1 (\text{e.g.: } 0.05) \end{array} \right\} \quad (12)$$ |
| 360 | An estimated linear vehicle yaw rate and an estimated lateral acceleration are calculated based on the driver steering angle $\delta$:<br><br>$$\dot{\psi}_{est} = \frac{V_x}{N_g(L + K_{unom}V_x^2)}\delta$$<br><br>$a_{yest} = V_x \dot{\psi}_{est}$<br>$K_{unom}$ steady-state nominal understeer is defined as<br><br>$$K_{unom} = \frac{Mg}{L}\left(\frac{b}{C_{f0}} - \frac{a}{C_{r0}}\right)$$ |
| 370 | $\text{Abs}(\dot{\psi}) < K_{\psi low\_thr}$ (e.g. 2 deg/sec) ; and<br>$\text{Abs}(\dot{\psi}_{est} - \dot{\psi}) < K_{\psi err\_thr}$ (e.g. 0.5 deg/sec) ; and<br>$\text{Abs}(a_y) < K_{aylow\_thr}$ (e.g. 0.1 m/sec$^2$); and When > X seconds? (e.g., 2<br>$\text{Abs}(a_{yest} - a_y) > K_{ay err\_thr}$ (e.g. 0.8 m/sec$^2$)<br>sec)<br>wherein Abs(xx) is the absolute value of xx |
| 380 | Yes, it is set that $\hat{K}_u(k) = K_{unom}$ |
| 390 | No, the understeer behavior indicator is communicated:<br>$\hat{K}_u(k)$ |

This variable α is called a weighting factor. Since the object is to estimate the understeer behavior indicators of the steady-state and transient behaviors of the vehicle, the above estimate must be able to continuously track the transient and steady-state behavior of the vehicle.

If this variable α is set as 1, the algorithm described above can provide fast initial convergence for the solution of the general steering dustproof required by the vehicle in the steady-state condition. However, when the vehicle is in a transient mode, α=1 is not suitable for transient conditions. Because in this case, P (k) quickly converges to zero and the estimator is switched off. However, if α is set to be less than 1 and the vehicle is in a transient mode, and if the vehicle's understeer behavior changes suddenly, it is estimated that $\varepsilon^2$ (k) will increase and P (k) will increase rapidly so that it can adapt quickly. After self-adaptation, $\varepsilon^2$ (k) decreases and it should return close to 1.

Referring to FIG. 4, the expected yaw rate command processing module 118 is determined according to the expected response of the vehicle to the steering input of the driver. The expected vehicle response is based on the structure of the system input-output transfer function derived from the vehicle yaw plane dynamics formulas (1), (2), (3), (4), (5), and (6) as follows:

$$\frac{\dot{\psi}_c(s)}{\delta_f(s)} = \frac{b_2 s + (a_{21} b_1 - a_{11} b_2)}{s^2 - (a_{11} + a_{22})s + (a_{11}a_{22} - a_{12}a_{21})}; \quad (13)$$

$$a_{11} = -\frac{C_{f0} + C_{r0}}{M_v v_x} \quad a_{12} = \frac{-aC_{f0} + bC_{r0}}{M_v v_x} - v_x \quad (14)$$

$$a_{21} = \frac{-aC_{f0} + bC_{r0}}{I_z v_x} \quad a_{22} = -\frac{a^2 C_{f0} + b^2 C_{r0}}{I_z v_x}$$

$$\text{wherein, } b_1 = \frac{C_{f0}}{M_v} \quad b_2 = \frac{aC_{f0}}{I_z};$$

The equation (13) can be reproduced from the system inherent frequency and damping ratio as follows:

$$\frac{\dot{\psi}_c(s)}{\delta_f(s)} = \frac{(s/z_\psi + 1)\omega_n^2}{s^2 + 2\zeta \omega_n s + \omega_n^2} \dot{\psi}_{css\_gain}; \quad (15)$$

$$\text{wherein, } \dot{\psi}_{css\_gain} = \frac{a_{21} b_1 - a_{11} b_2}{a_{12}a_{22} - a_{12}a_{21}}. \quad (16)$$

The formula (16) is the steady-state gain of the required yaw rate command, and the steady gain of the required yaw gain is listed in a query table according to the steering angle (degrees) and the vehicle speed (km/h). An example of this query table is shown in Table 2 below.

TABLE 2

| $v_x$ \ $\delta$ | 0 | 2.35 | 4.7 | 7.05 | 9.41 | 11.76 | 14.11 | 16.47 | 18.81 | 21.16 | 23.52 | 25.87 | 28.22 |
|---|---|---|---|---|---|---|---|---|---|---|---|---|---|
| 20 | 0 | 1.84 | 1.87 | 1.9 | 1.91 | 1.9 | 1.92 | 1.94 | 1.94 | 1.93 | 1.93 | 1.92 | 1.9 |
| 30 | 0 | 2.62 | 2.69 | 2.73 | 2.74 | 2.73 | 2.75 | 2.75 | 2.7 | 2.57 | 2.32 | 2.11 | 1.94 |
| 40 | 0 | 3.3 | 3.39 | 3.41 | 3.39 | 3.26 | 3 | 2.6 | 2.27 | 2.02 | 1.82 | 1.65 | 1.5 |
| 50 | 0 | 3.85 | 3.9 | 3.81 | 3.49 | 2.94 | 2.45 | 2.1 | 1.84 | 1.63 | 1.47 | 1.34 | 1.23 |
| 60 | 0 | 4.28 | 4.2 | 3.77 | 3.07 | 2.46 | 2.05 | 1.76 | 1.54 | 1.37 | 1.23 | 1.12 | 1.03 |
| 70 | 0 | 4.54 | 4.22 | 3.44 | 2.64 | 2.11 | 1.76 | 1.51 | 1.32 | 1.17 | 1.06 | 0.96 | 0.88 |
| 80 | 0 | 4.68 | 4.05 | 3.07 | 2.31 | 1.85 | 1.54 | 1.32 | 1.16 | 1.03 | 0.93 | 0.84 | 0.77 |
| 90 | 0 | 4.7 | 3.78 | 2.74 | 2.06 | 1.65 | 1.37 | 1.18 | 1.03 | 0.91 | 0.82 | 0.75 | 0.69 |
| 100 | 0 | 4.62 | 3.5 | 2.47 | 1.85 | 1.48 | 1.23 | 1.06 | 0.93 | 0.82 | 0.74 | 0.67 | 0.62 |
| 110 | 0 | 4.52 | 3.24 | 2.34 | 1.68 | 1.34 | 1.12 | 0.96 | 0.84 | 0.75 | 0.67 | 0.61 | 0.56 |
| 120 | 0 | 4.35 | 2.99 | 2.05 | 1.54 | 1.23 | 1.03 | 0.88 | 0.77 | 0.68 | 0.62 | 0.56 | 0.51 |
| 130 | 0 | 4.18 | 2.78 | 1.89 | 1.42 | 1.13 | 0.95 | 0.81 | 0.71 | 0.63 | 0.57 | 0.52 | 0.47 |
| 140 | 0 | 4.01 | 2.59 | 1.75 | 1.32 | 1.05 | 0.88 | 0.75 | 0.66 | 0.58 | 0.53 | 0.48 | 0.44 |
| 150 | 0 | 3.82 | 2.42 | 1.63 | 1.23 | 0.98 | 0.82 | 0.7 | 0.61 | 0.54 | 0.49 | 0.45 | 0.41 |
| 160 | 0 | 3.65 | 2.27 | 1.53 | 1.15 | 0.92 | 0.76 | 0.66 | 0.57 | 0.51 | 0.46 | 0.42 | 0.38 |

The damping ratio and the inherent frequency of the required vehicle performance can be expressed by a system parameter as below:

$$\omega_n = \sqrt{a_{11}a_{22} - a_{12}a_{21}} \quad (17)$$

$$\zeta = -\frac{a_{11} + a_{22}}{2\omega_n}.$$

Figure 6:
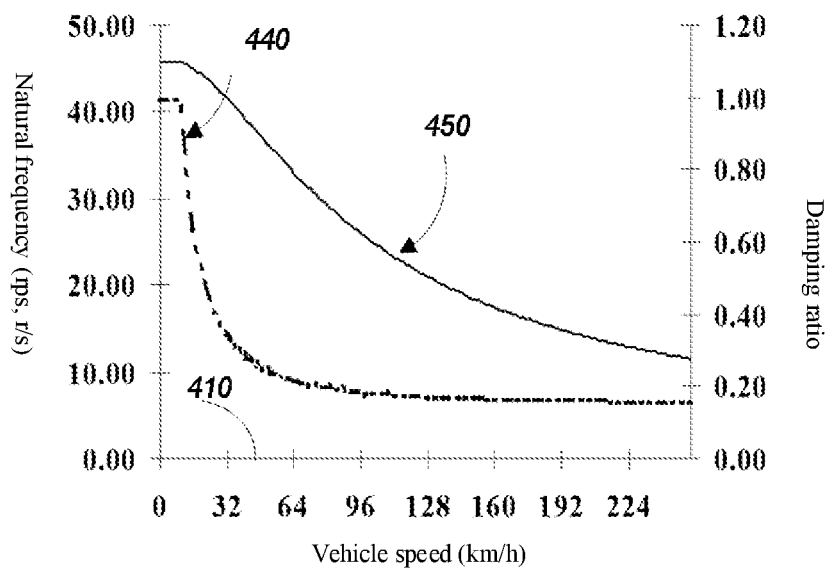
FIG. 6 illustrates a typical trajectory of a natural frequency and a damping ratio using a nominal value of a vehicle parameter provided by an embodiment of the present disclosure.

FIG. 6 illustrates a typical trajectory of a natural frequency φn (arrow 440) and a damping ratio ζ (arrow 450) using a nominal value of a vehicle parameter provided by an embodiment of the present disclosure. It is a function of the vehicle speed (arrow 410).

For yaw rate $z_\psi$, this variable can be expressed as:

$$z_\psi = a_{21} \frac{b_2}{b_1} - a_{22}. \quad (18)$$

Figure 7:
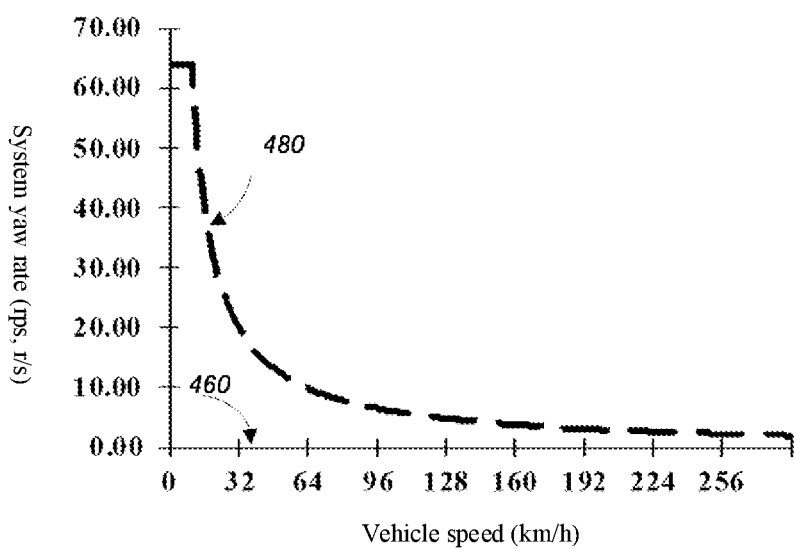
FIG. 7 illustrates a trajectory chart of a typical value using a nominal vehicle parameter as a function of vehicle speed provided by an embodiment of the present disclosure.

FIG. 7 illustrates a trajectory chart of a typical value (arrow 460) using a nominal vehicle parameter (arrow 480) as a function of vehicle speed provided by an embodiment of the present disclosure. FIG. 6 may modify FIG. 7 to reflect an expected design of required vehicle maneuvering characteristics during the vehicle control calibration.

According to formula (15), the expected yaw rate command is determined as:

$$\dot{\psi}_c(s) = \frac{(s/z_\psi + 1)\omega_n^2}{s^2 + 2\zeta \omega_n s + \omega_n^2} \dot{\psi}_{css\_gain} \delta_f(s); \quad (19)$$

as described above, the vehicle correcting yaw moment control of the electric power steering system provided in the present disclosure is intended to improve the handling dynamics of the vehicle. The structure of the vehicle correcting yaw moment consists of feedforward compensation and yaw rate feedback compensation relative to the front steering angle, as shown in the following formula:

$$\Delta \Psi_s(s) = \Delta \Psi_{FF}(s) + \Delta \Psi_{FB}(s)$$

$$\Delta \Psi_{FF}(s) = aC_f \Delta \delta_{FF}, \Delta \Psi_{FB}(s) = aC_f \Delta \delta_{FB} \quad (20);$$

the feedforward compensation is described as:

$$\delta_{FF}(s) G_{FFP} \delta(s) \quad (21);$$

wherein GFFP is the proportional gain of the feedforward control;

the feedback compensation is described as:

$$\delta_{FB}(s) = (G_{FBP} + G_{FBD}s) \Delta \dot{\psi}_e(s)$$

$$\Delta \dot{\psi}_e(s) = \dot{\psi}_c(s) - \dot{\psi}(s) \quad (22),$$

wherein GFBP and GFBD are proportional, and derivative gains of the feedback control.

The feedforward and feedback control of the present disclosure will be described in detail below. Referring to FIG. 4, the feedforward control processing module 122 receives, from the yaw rate command processing module 118, a yaw rate command signal, a driver steering angle, a vehicle speed signal, a vehicle yaw rate signal, and an understeer behavior indicating signal from the understeer behavior processing module 116 to generate a feedforward control signal ΔδFF.

Figure 8:
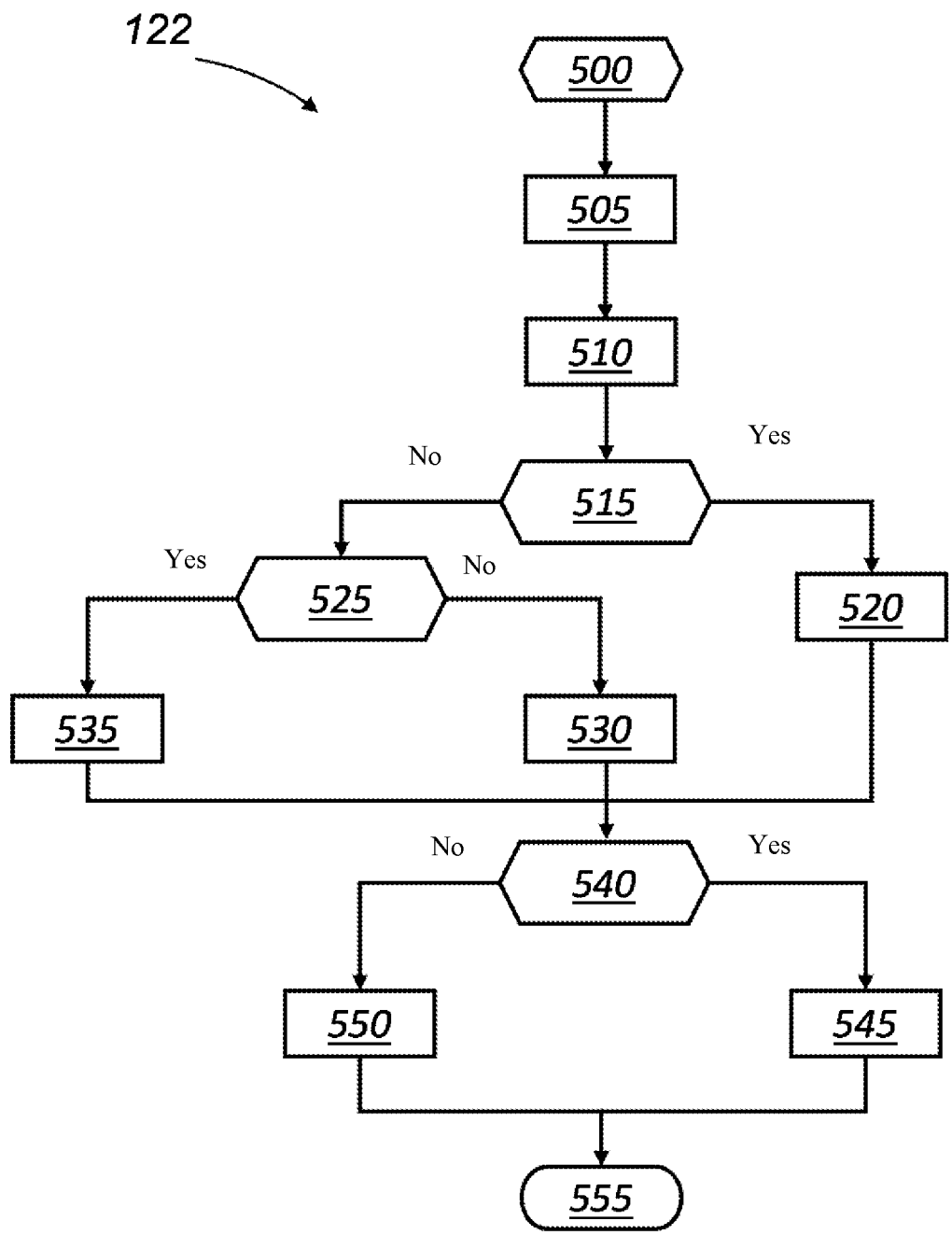
FIG. 8 illustrates a schematic diagram of a step of calculating a feedforward control signal provided by an embodiment of the present disclosure.

FIG. 8 illustrates a schematic diagram of a step of calculating a feedforward control signal provided by an embodiment of the present disclosure. Table 3 is provided as a keyword, wherein a numerically labeled block and the corresponding function corresponding to the process for calculating the feedforward control are described below.

The feedforward gain GFFP is listed in the form of an understeer behavior indicator (deg/g) and a vehicle speed (km/h) in a query table. An example of the query table is as shown in Table 4 below.

TABLE 4

| | $\hat{K}_u$ | | | | | | | | |
|---|---|---|---|---|---|---|---|---|---|
| $v_x$ | −8 | −6 | −4 | −2 | 0 | 2 | 4 | 6 | 8 |
| 0 | 0.00 | 0.00 | 0.00 | 0.00 | 0.00 | 0.00 | 0.00 | 0.00 | 0.00 |
| 20 | 0.18 | 0.14 | 0.10 | 0.06 | 0.03 | 0.01 | 0.05 | 0.08 | 0.11 |
| 40 | 0.65 | 0.51 | 0.37 | 0.23 | 0.10 | 0.04 | 0.15 | 0.24 | 0.32 |
| 60 | 1.31 | 1.03 | 0.75 | 0.47 | 0.19 | 0.08 | 0.27 | 0.39 | 0.48 |
| 80 | 2.03 | 1.60 | 1.16 | 0.73 | 0.30 | 0.12 | 0.36 | 0.50 | 0.59 |
| 100 | 2.72 | 2.14 | 1.56 | 0.98 | 0.40 | 0.15 | 0.43 | 0.57 | 0.66 |
| 120 | 3.34 | 2.63 | 1.91 | 1.20 | 0.49 | 0.18 | 0.48 | 0.62 | 0.70 |
| 140 | 3.86 | 3.04 | 2.21 | 1.39 | 0.56 | 0.21 | 0.52 | 0.66 | 0.73 |
| 160 | 4.31 | 3.39 | 2.47 | 1.55 | 0.63 | 0.22 | 0.55 | 0.68 | 0.75 |
| 180 | 4.67 | 3.67 | 2.68 | 1.68 | 0.68 | 0.24 | 0.57 | 0.70 | 0.77 |
| 200 | 4.97 | 3.91 | 2.85 | 1.79 | 0.73 | 0.25 | 0.58 | 0.71 | 0.78 |

It should be noted that in severe oversteer situations, i.e. when the understeer behavior indicator Ku is provided with a large negative value, the feedforward control will generate a steering torque that is opposite to the driver-input torque. When the feedforward gain is greater than 1, it will be shown in the query table example described in Table 4, in which

TABLE 3

| Sequence number of steps | The content of a step |
|---|---|
| 500 | Start the routine<br>$\delta_{FF} = 0$<br>$\text{Flag}_{FF} = 0$ |
| 505 | At each step interval k,<br>input the vehicle speed $v_x$,<br>the vehicle yaw rate $\dot{\psi}$,<br>the driver steering angle $\delta$,<br>the required command yaw rate $\dot{\psi}_c$,<br>and the understeer behavior indicator $\hat{K}_u(k)$. |
| 510 | The feedforward gain is calculated as follows:<br><br>$$G_{FFP}(k) = \begin{cases} \dfrac{\left((K_{unom} - \hat{K}_u(k))v_x^2(k)\right)}{\left(L + \hat{K}_u(k)v_x^2(k)\right)} & \text{for } \hat{K}_u(k) > 0 \text{ (i.e., understeer)} \\ \dfrac{\left((K_{unom} - \hat{K}_u(k))v_x^2(k)\right)}{\left(L + K_{unom}v_x^2(k)\right)} & \text{for } \hat{K}_u(k) \leq 0 \text{ (i.e., oversteer)} \end{cases} \quad (23)$$<br><br>during vehicle testing, the feedforward gain (23) is calibrated to a query table to refleet the expected design of the desired vehicle maneuvering characteristics. (an example, as shown below) |
| 515 | Determine whether $\Delta\dot{\psi}_e(k) = \dot{\psi}_c(k) - \dot{\psi}(k) \geq \text{Ke}_{yaw\_thr\_hi}$ is valid.<br>(e.g., $\text{Ke}_{yaw\_thr\_hi} = 0.14$ rad/sec)<br>y«w_thr_hi = 0.14 rad/sec) |
| 520 | Yes<br>$\text{Flag}_{FF}(k) = 1$ |
| 525 | No<br>Determine whether $\Delta\dot{\psi}_e(k) < \text{Ke}_{yaw\_thr\_low}$ is valid.<br>(e.g., $\text{Ke}_{yaw\_thr\_low} = 0.017$ rad/sec) |
| 530 | Yes<br>$\text{Flag}_{FF}(k) = 0$ |
| 535 | No<br>$\text{Flag}_{FF}(k) = \text{Flag}_{FF}(k-1)$ |
| 540 | Determine whether $\text{Flag}_{FF}(k) = 1$ is valid. |
| 545 | Yes:<br>$\Delta\delta_{FF}(k) = -G_{FFP}(k)\delta(k) \quad (24)$ |
| 550 | No<br>$\Delta\delta_{FF}(k) = \Delta\delta_{FF}(k-1)e^{-\tau}$<br>(e.g. $\tau = 0.1$ sec)<br>e = 2.71828183 |
| 555 | Transmit $\Delta\delta_{FF}(k)$ | case the feedforward signal will be greater than the driver input shown in formula (24) and the result will be opposite to the initial input.

When the vehicle experiences a large degree of oversteer, the driver needs to reverse the steering wheel to stabilize the vehicle, in which case the feedforward control will produce a torque overlay that will urge the driver to reverse the steering wheel.

Step 205: when the expected deviation value is within the second preset range, determining a steering angle feedback control parameter such that the vehicle runs by adjusting the steering torque according to the steering angle feedback control parameter.

Specifically, acquiring a proportional derivative gain of the proportional-derivative function when the expected deviation value is within the second preset range which indicates that the vehicle oversteers; and determining a steering angle feedback control parameter based on the proportional derivative gain such that the vehicle runs by adjusting the steering torque according to the steering angle feedback control parameter. A proportional term is determined by multiplying the proportional gain by the yaw rate error signal and the derivative term is determined by multiplying the derivative gain by the yaw acceleration error signal, the yaw rate error signal may be obtained according to the yaw rate, and the yaw acceleration error signal may be obtained according to the vehicle speed.

Referring to FIG. 4, the yaw rate command processing module 118 may also receive a vehicle speed signal and a driver steering angle and generate a yaw rate command signal. The feedforward control processing module 122 receives a driver steering angle and a yaw rate command signal from the yaw rate command processing module 118. The vehicle speed signal, the yaw rate command signal, and the understeer behavior indicator come from the understeer behavior processing module 116 and generate a feedforward control signal ΔδFF. Similarly, the feedback control processing module 124 receives the yaw rate command signal, the vehicle yaw rate signal, the vehicle speed signal, and the understeer behavior indicator from the understeer behavior processing module 116 and generates the feedback control signal ΔδFB.

The feedforward control signal ΔδFF and the feedback control signal ΔδFB are added together to provide a steering request signal Δδc. The control interface module 130 converts the steering request signal Δδc to a torque overlay control request signal. The torque overlay control request signal, the driver steering torque (TD), and the torque auxiliary request (TA) are calculated via the characteristic curve, and are applied to the summer 134 to provide the electric steering torque command signal. The electric steering torque command signal is applied to the motor 32 in the actuator 114, the motor 32 generating a steering torque signal that is applied to the vehicle steering apparatus.

Figure 9:
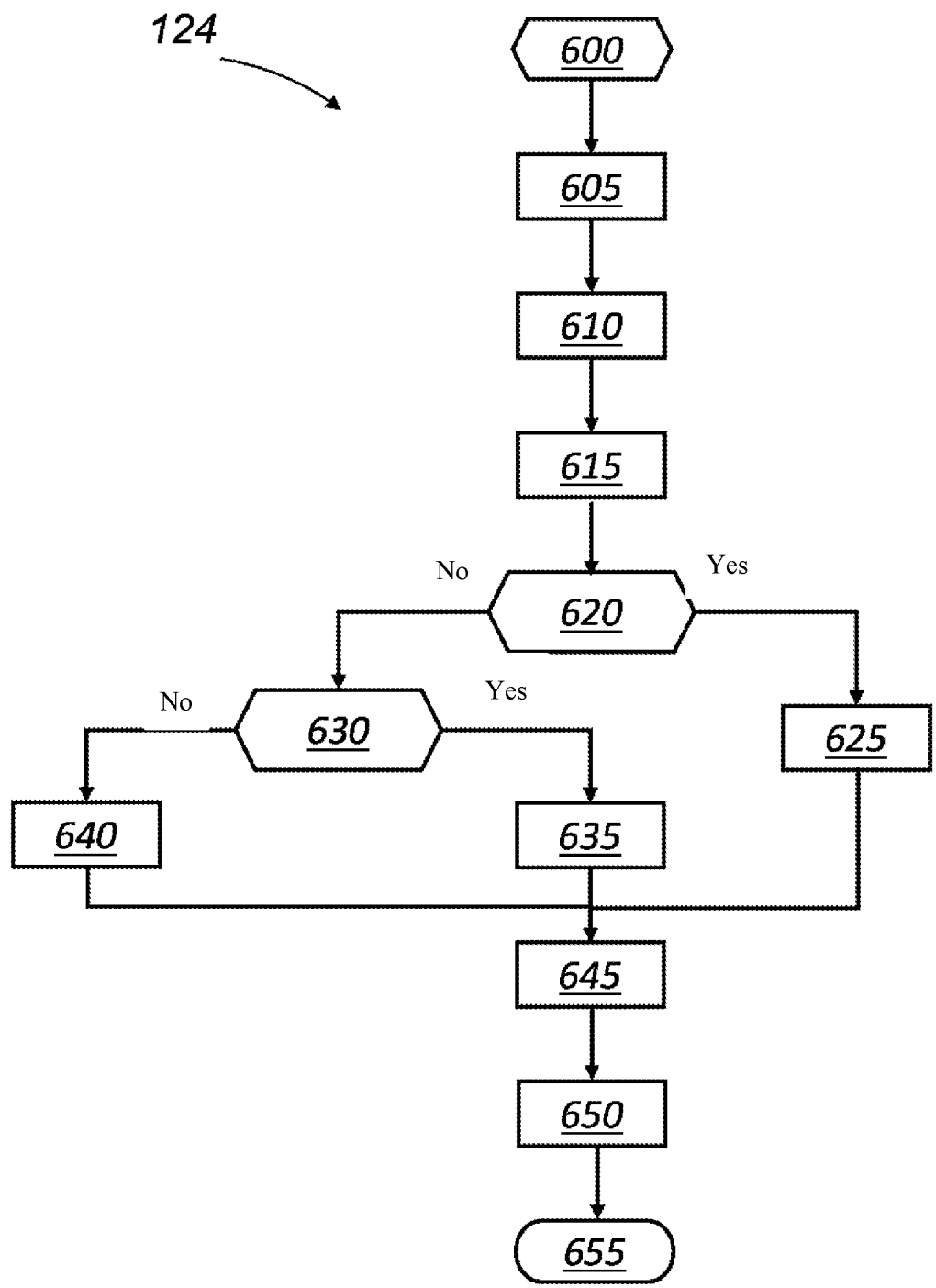
FIG. 9 illustrates a schematic diagram of a step of calculating a feedback control signal provided by an embodiment of the present disclosure.

FIG. 9 illustrates a schematic diagram of a step of calculating a feedback control signal ΔδFB provided by an embodiment of the present disclosure. Table 5 is provided as a keyword, wherein it corresponds to the process for calculating the feedback control. A numerically labeled block and the corresponding function are described below.

TABLE 5

| Sequence number of steps | The content of a step |
|---|---|
| 600 | Start the routine $\text{Flag}_{FF} = 0$ |
| 605 | At each step interval k, input the vehicle speed $v_x$, the vehicle yaw rate $\dot{\psi}$, the required command yaw rate $\dot{\psi}_c$, and the understeer behavior indicator $\hat{K}_u(k)$. |
| 610 | Calculate the yaw rate error and the yaw acceleration error: $$\Delta\dot{\psi}_e(k) = \dot{\psi}_c(k) - \dot{\psi}(k)$$ $$\Delta\ddot{\psi}_e(k) = \frac{\Delta\dot{\psi}_e(k) - \Delta\dot{\psi}_e(k-1)}{T_{samp}}$$ $T_{samp}$ is the sampling time of a control loop (e.g., 0.01 seconds) |
| 615 | Calculate $\Delta\Omega(k) = f_p(\hat{K}_u)|\Delta\dot{\psi}_e(k)| + f_d(\hat{K}_u)|\Delta\ddot{\psi}_e(k)|$ (Below are examples of $f_p$ and $f_d$ $$f_p(\hat{K}_u) = \begin{cases} 0.25 \text{ for } \hat{K}_u > 0 \\ 0.2 \text{ for } \hat{K}_u \leq 0 \end{cases}, f_d = \begin{cases} 0.23 \text{ for } \hat{K}_u > 0 \\ 0.15 \text{ for } \hat{K}_u \leq 0 \end{cases}$$ |
| 620 | Determine whether $\Delta\Omega(k) > D_b(\delta, v_x)$ and $v_x > k_{v\_thr}$ ? are valid (e.g. 10 kph) (an example of the dead zone Db is as shown below) |
| 625 | Yes $\text{Flag}_{FB}(k) = 1$ |
| 630 | Determine whether $|\Delta\dot{\psi}_e(k)| \leq D_b(\delta, v_x)$ and $|\Delta\dot{\psi}_e(k)| < K_{\psi\_thres}$ (e.g., X seconds) are valid. |
| 635 | Not valid, $\text{Flag}_{FB}(k) = 0$ |
| 640 | Not valid, $\text{Flag}_{FB}(k) = \text{Flag}_{FB}(k-1)$ |

TABLE 5-continued

| Sequence number of steps | The content of a step |
|---|---|
| 645 | Calculate proportional gain and derivative gain related to vehicle speed (examples are shown below) Input: vehicle speed (kph) = [10 20 40 60 80 100 150] Output: proportional gain GFBP = [2.1 2.1 1.95 1.47 1.22 1.11.1] Output: derivative gain GFBD = [13 13 12 12 12 11 11] * 10-3 |
| 650 | Determine the feedback control: $\Delta\delta_{FB}(k) = -\text{sign}(\hat{K}_u(k))(G_{FBP}\Delta\dot{\psi}_e(k) + G_{FBP}\Delta\ddot{\psi}_e(k))\text{Flag}_{FB}(k)$ $\text{sign}(\hat{K}_u(k)) = \begin{cases} 1 \text{ for } \hat{K}_u(k) > 0 \\ -1 \text{ for } \hat{K}_u(k) \leq 0 \end{cases}$ |
| 655 | Determine $\Delta\delta_{FB}(k)$ |

The dead zone Db (rad/sec) is listed in a query table according to the steering wheel angle (deg) and the vehicle speed (km/h). An example of the query table is as shown in Table 6 below:

TABLE 6

| | δ | | | | | |
|---|---|---|---|---|---|---|
| $v_x$ | 0 | 114 | 228 | 342 | 456 | 570 |
| 0 | 0.15 | 0.16 | 0.17 | 0.18 | 0.24 | 0.27 |
| 50 | 0.15 | 0.15 | 0.16 | 0.17 | 0.21 | 0.25 |
| 100 | 0.14 | 0.15 | 0.15 | 0.16 | 0.19 | 0.21 |
| 150 | 0.14 | 0.14 | 0.15 | 0.15 | 0.17 | 0.19 |
| 200 | 0.16 | 0.17 | 0.17 | 0.17 | 0.17 | 0.19 |
| 250 | 0.19 | 0.19 | 0.19 | 0.19 | 0.19 | 0.19 |

A careful study of the feedback control shows that when the vehicle is under-steered, the sign of the control signal is opposite to the sign of the control signal when the vehicle is over-steered. Similar to the feed-forward, the reason is to reduce the steering input to the front wheel during severe understeer operation, resulting in the understeer of the vehicle and enhanced stability of the vehicle.

The feedforward control signal ΔδFF and the feedback control signal ΔδFB are added together to provide a steering request signal Δδc shown as below.

$$\Delta\delta_c = \Delta\delta_{FF} + \Delta\delta_{FB} \quad (26)$$

The feedforward steering command and the feedback control are input as angle requests, but the controller of EPS requires steering torque. To determine the dynamics characteristics of a steering model, an approximate estimate can be made by an autoregressive moving average discrete model in the following mode:

$$\frac{\delta}{T} = \frac{a_1 z^{-1} + a_2 z^{-2} + a_3 z^{-3}}{1 + b_1 z^{-1} + b_2 z^{-2}}; \quad (27)$$

The parameters {a1, a2, a3, b1, b2} are unknown, δ is the input steering angle (known), T is the EPS torque auxiliary (known), and recursive least squares are used to estimate a model parameter.

The equation (27) may be updated as:

$$\delta(k) = \varphi^T(k)\theta(k)$$

wherein $$\theta^T(k) = [-b_1 -b_2 a_1 a_2 a_3]$$

$$\varphi^T(k) = [\delta(k-1)\delta(k-2)\delta(k-)T(k-1)T(k-2)] \quad (28).$$

The least squares are used to estimate the model parameters as follows:

$$\hat{\theta}(k) = \hat{\theta}(k-1) + \frac{P(k-1)\varphi(k)}{1+\varphi^T(k)P(k-1)\varphi(k)}\left(\delta(k) - \varphi^T(k)\hat{\theta}(k-1)\right) \quad (29)$$

$$P(k) = \left(P(k-1) - \frac{P(k-1)\varphi(k)\varphi^T(k)P(k-1)}{1+\varphi^T(k)P(k-1)\varphi(k)}\right).$$

The parameters in equation (29) are estimated in experiments at different vehicle speeds to determine the relationship between steering angle and the torque described in equation (27). These parameters can be programmed in the next step.

The control interface module 130 uses these and programmed parameters to establish a relationship between the steering angle Δδc control and the torque overlay control TOC. An example of such a relationship at 120 kph vehicle speed is as follows:

$$\frac{T_{OC}}{\Delta\delta_C} = \frac{1 - 1.996z^{-1} + -0.997z^{-2}}{-0.0042z^{-1} + 0.00437z^{-2} - 0.001z^{-3}}. \quad (30)$$

Figure 10:
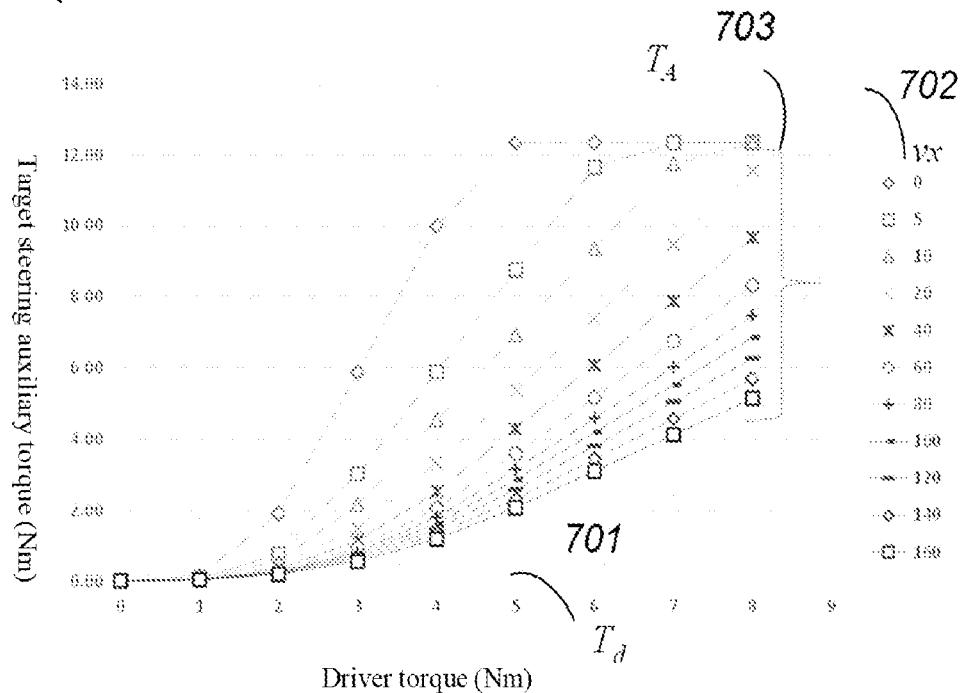
FIG. 10 illustrates a schematic diagram for determining a target steering auxiliary torque for EPS provided by an embodiment of the present disclosure.

FIG. 10 illustrates a schematic diagram for determining a target steering auxiliary torque for EPS provided by an embodiment of the present disclosure. The target steering auxiliary torque is obtained through an EPS system experiment. The control module 128 shows the relationship of the EPS target steering auxiliary torque arrow 703. The target steering auxiliary torque arrow 703 of the EPS is determined experimentally when driving the vehicle at different vehicle speed arrows 702 and applying different driver steering torque Td arrows 701. Once the control module 128 is determined, an experimental model may be constructed. The target steering auxiliary torque arrow 703 stored in the EPS controller is identified as a function of the vehicle speed and the driver steering torque is as follows:

$$TA = f(vx, Td) \quad (31).$$

The following table illustrates example values for target torque auxiliary.

TABLE 7

| $T_{d\,(Nm)}$ | $V_{x(kph)}$ | | | | | | | | | | |
|---|---|---|---|---|---|---|---|---|---|---|---|
| | 0 | 5 | 10 | 20 | 40 | 60 | 80 | 100 | 120 | 140 | 160 |
| 0 | 0.00 | 0.00 | 0.00 | 0.00 | 0.00 | 0.00 | 0.00 | 0.00 | 0.00 | 0.00 | 0.00 |
| 1 | 0.16 | 0.07 | 0.07 | 0.06 | 0.05 | 0.05 | 0.05 | 0.04 | 0.04 | 0.04 | 0.04 |
| 2 | 1.90 | 0.76 | 0.55 | 0.42 | 0.34 | 0.29 | 0.26 | 0.24 | 0.23 | 0.21 | 0.20 |
| 3 | 5.88 | 3.01 | 2.15 | 1.48 | 1.13 | 0.93 | 0.82 | 0.74 | 0.67 | 0.61 | 0.56 |
| 4 | 9.99 | 5.89 | 4.53 | 3.32 | 2.52 | 2.05 | 1.79 | 1.62 | 1.46 | 1.31 | 1.18 |
| 5 | 12.34 | 8.77 | 6.94 | 5.37 | 4.30 | 3.58 | 3.15 | 2.85 | 2.57 | 2.31 | 2.06 |
| 6 | 12.34 | 11.64 | 9.34 | 7.43 | 6.09 | 5.17 | 4.59 | 4.19 | 3.81 | 3.44 | 3.09 |
| 7 | 12.34 | 12.34 | 11.75 | 9.49 | 7.88 | 6.75 | 6.03 | 5.53 | 5.04 | 4.57 | 4.12 |
| 8 | 12.34 | 12.34 | 12.34 | 11.54 | 9.67 | 8.33 | 7.47 | 6.86 | 6.27 | 5.70 | 5.15 |

The torque overlay control request signal (TOC), the driver steering torque (TD), and the torque auxiliary request (TA) listed in the control module 128 are applied to a summer 134 to provide an electric steering torque command signal (TEPS). The electric steering torque command signal (TEPS) is applied to the motor 32 in the EPS's actuator 114. The motor 32 generates a steering torque signal (TM) that is applied to the vehicle's steering apparatus.

The EPS torque overlay control system is provided with the feature of integrating chassis steering and braking control, which can help the driver control the vehicle under the most severe driving conditions. The integration assists the driver in controlling the vehicle by electronically comparing the operation the driver wishes to perform with how the vehicle actually responds. If the vehicle fails to respond to the driver's maneuver, or falls into a risk of rotating or coasting out of control, appropriate steering and braking controls are automatically initiated to stabilize and assist the driver in controlling the vehicle.

The EPS control and the electronic stability control system of the present disclosure are integrated to give the driver a higher probability of being able to control the vehicle when the driver is driving in severe road conditions such as ice surfaces, snowfields, gravel, or slippery road surfaces, and when the driver makes emergency lane change or dodging.

According to a control method provided by an embodiment of the disclosure, a vehicle with an electric power steering system acquires a front steering angle, steering torque, yaw rate, and vehicle speed of the vehicle, and determines a vehicle yaw rate associated with the first control subsystem according to the front steering angle, steering torque, yaw rate, and vehicle speed, and determines the expected deviation value associated with the second control subsystem based on the vehicle yaw rate, and determines the steering angle feedforward control parameter when the expected deviation value is within the first preset range so that the vehicle adjusts the steering torque according to the steering angle feedforward control parameter to drive, and determines the steering angle feedback control parameter when the expected deviation value is within the second preset range so that the vehicle adjusts the steering torque according to the steering angle feedback control parameter to drive. Therefore, for severe road surface conditions, such as overly wet or rugged road surface, the electric power steering system can control the vehicle to adjust the steering torque according to the control parameter, thereby enhancing the overall vehicle handling characteristic of the vehicle, avoiding using a relatively large braking operation to greatly reduce the speed of the vehicle, and avoiding the situation of shortening the service life of tires.

Figure 11:
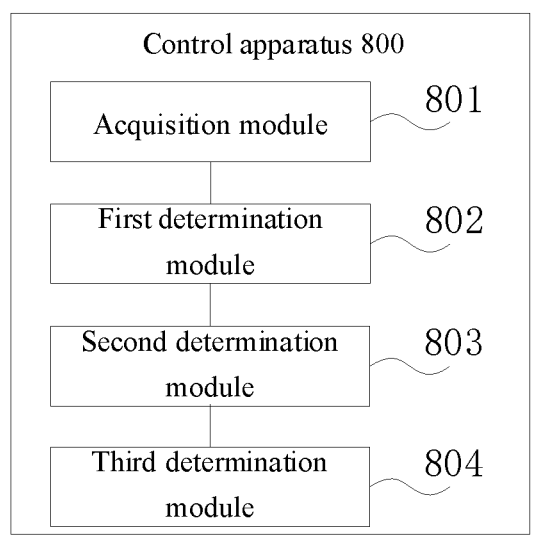
FIG. 11 is a schematic diagram showing a structure of a control apparatus provided in embodiment 3 of the present disclosure.

Referring to FIG. 11, there is shown a schematic diagram showing a structure of a control apparatus provided in embodiment 3 of the present disclosure. The control apparatus is applied to a vehicle provided with an electric power steering system including a first control subsystem and a second control subsystem.

As shown in FIG. 11, the control apparatus 800 may specifically include:

an acquisition module 801 configured for, acquiring a front steering angle, a steering torque, a yaw rate, and a vehicle speed of the vehicle;

a first determination module 802 configured for, determining a vehicle yaw rate associated with the first control subsystem according to the front steering angle, the steering torque, the yaw rate, and the vehicle speed;

a second determination module 803 configured for, determining an expected deviation value associated with the second control subsystem on the basis of the vehicle yaw rate; and and a third determination module 804 configured for, determining a control parameter on the basis of the expected deviation value such that the vehicle adjusts the steering torque to run according to the control parameter.

Optionally, the third determination module comprises:

a first determination sub-module configured for, when the expected deviation value is within the first preset range, determining a steering angle feedforward control parameter such that the vehicle runs by adjusting the steering torque according to the steering angle feedforward control parameter.

Optionally, the third determination sub-module comprises:

a second determination sub-module configured for, when the expected deviation value is within the second preset range, determining a steering angle feedback control parameter such that the vehicle runs by adjusting the steering torque according to the steering angle feedback control parameter.

Optionally, the first determination sub-module comprises:

a first acquisition unit configured for, acquiring a proportional gain of a proportional gain function when an expected deviation value is within a first preset range; and a first determination unit configured for, determining a steering angle feedforward control parameter according to the product of the proportional gain and the steering torque.

Optionally, the second determination sub-module comprises:

a second acquisition unit configured for, acquiring a proportional derivative gain of the proportional-derivative function when the expected deviation value is within a second preset range; and a second determination unit configured for, determining a steering angle feedback control parameter based on the proportional derivative gain such that the vehicle runs by adjusting the steering torque according to the steering angle feedback control parameter.

The specific implementation mode of the control apparatus in an embodiment of the present disclosure has been described in detail on the method side and will not be described in detail herein.

According to the control method provided by an embodiment of the present disclosure, a vehicle with an electric power steering system can acquire a front steering angle, steering torque, yaw rate, and vehicle speed of the vehicle via an acquisition module, and determines, via a first determination module, a vehicle yaw rate associated with the first control subsystem according to the front steering angle, steering torque, yaw rate, and vehicle speed, and determines, via a second determination module, the expected deviation value associated with the second control subsystem based on the vehicle yaw rate, and determines, via a third determination module, a control parameter based on the expected deviation value, so that the vehicle runs by adjusting the steering torque according to the control parameter. Therefore, for severe road surface conditions, such as overly wet or rugged road surface, the electric power steering system can control the vehicle to adjust the steering torque according to the control parameter, thereby enhancing the overall vehicle handling characteristic of the vehicle, avoiding using a relatively large braking operation to greatly reduce the speed of the vehicle, and avoiding the situation of shortening the service life of tires.

The embodiments of the apparatus described above are merely schematic, wherein the units illustrated as separate parts may or may not be physically separated, and the parts shown as units may or may not be physical units, i.e., they may be located in one place, or may also be distributed over a plurality of network units. Some or all of the modules may be selected to achieve the objects of the embodiment schemes according to actual needs. A person of ordinary skills in the art could understand and implement the present disclosure without involving any inventive efforts.

Various part embodiments of the present disclosure may be implemented in hardware, or in a software module running on one or more processors, or in a combination thereof. Those skilled in the art will appreciate that a microprocessor or digital signal processor (DSP) may be used in practice to implement some or all of the functions of some or all of the parts of a computing processing device according to the embodiments of the present disclosure. The present disclosure may also be embodied as a device or an apparatus program (e.g., a computer program and a computer program product) for performing a portion or all of the methods described herein. Such a program implementing the present disclosure may be stored on a computer readable medium or may be in the form of one or more signals. Such signals may be downloaded from an Internet website, provided on a carrier signal, or provided in any other form.

Figure 12:
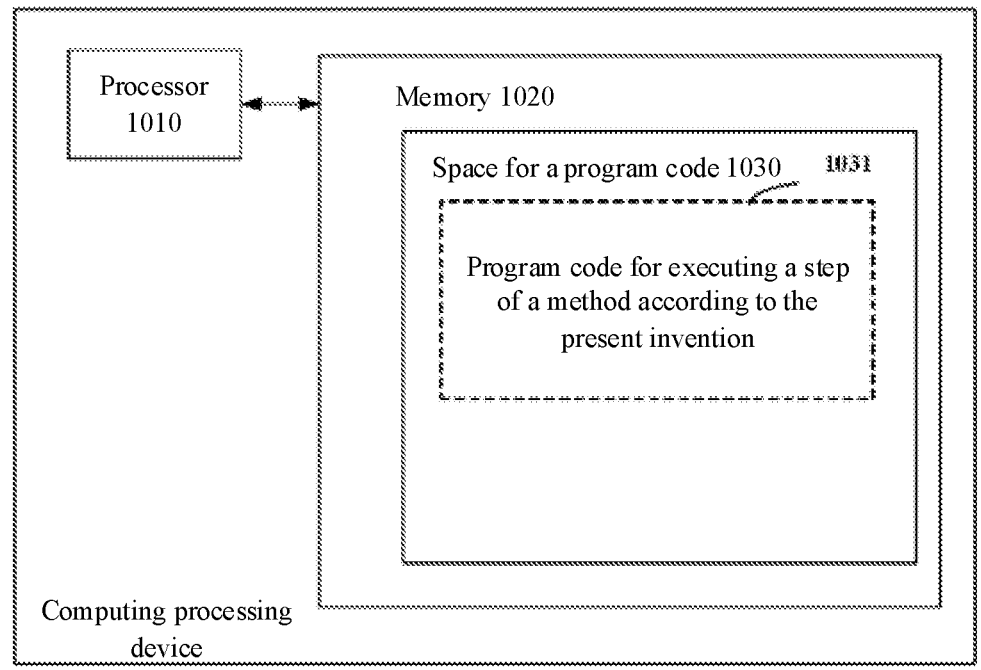
FIG. 12 schematically shows a block diagram of a computing processing device for executing a method according to the present disclosure.
Figure 13:
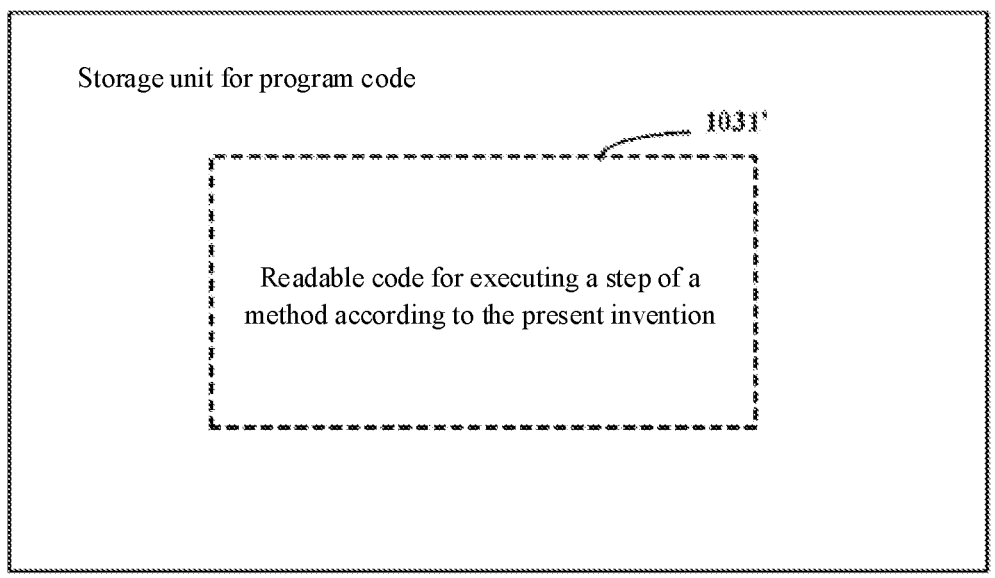
FIG. 13 schematically shows a storage unit for holding or carrying a program code implementing a method according to the present disclosure.

For example, FIG. 12 shows a computing processing device that may implement a method according to the present disclosure. The computing processing device conventionally includes a processor 1010 and a computer program product or computer-readable medium in the form of a memory 1020. The memory 1020 may be an electronic memory such as flash memory, EEPROM (electrically erasable programmable read only memory), EPROM, hard disk, or ROM. The memory 1020 has a memory space 1030 for a program code 1031 for performing any of the method steps of the above method. For example, the memory space 1030 for the program code may include each program code 1031 for implementing various steps in the above method, respectively. The program codes may be read from or written into one or more computer program products. These computer program products comprise a program code carrier such as a hard disk, a compact disc (CD), a memory card, or a floppy disk. Such a computer program product is usually a portable or fixed storage unit as described with reference to FIG. 13. The storage unit may have storage segments, memory space, etc. arranged similarly to the memory 1020 in the computing processing device of FIG. 12. The program code may, for example, be compressed in a suitable form. Generally, the storage unit includes a computer readable code 1031', i.e., a code that can be read by a processor, such as, for example, 1010. These codes, when run by a computing processing device, cause the computing processing device to perform the various steps in the method described above.

Reference herein to "one embodiment", "an embodiment", or "one or more embodiments" means that a particular feature, structure, or characteristic described in connection with the embodiment is included in at least one embodiment of the present disclosure. In addition, please note that instances of the phrase "in one embodiment" herein are not necessarily all referring to the same embodiment.

In the description provided herein, numerous specific details are set forth. However, it could be understood that embodiments of the disclosure may be practiced without these specific details. In some instances, well-known methods, structures, and techniques have not been shown in detail in order not to obscure the understanding of this description.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The disclosure can be implemented by means of hardware comprising several distinct elements, and by means of a suitably programmed computer. In the unit claims enumerating several apparatuses, several of these apparatuses can be specifically embodied by one and the same item of hardware. The use of the words first, second, third, etc. does not denote any order. These words may be interpreted as names.

Finally, it should be noted that: the above embodiments are provided only to illustrate the technical solution of the present disclosure, not to limit it; while the present disclosure has been described in detail with reference to the foregoing embodiments, those skilled in the art will appreciate that: the technical solutions disclosed in the above-mentioned embodiments can still be modified, or some of the technical features thereof can be replaced by equivalents; such modifications and substitutions do not make the essence of the corresponding technical solutions deviate from the spirit and scope of the technical solutions of the embodiments of the present disclosure.

The invention claimed is:

1. A control method, wherein the method is applied to a vehicle provided with an electric power steering system, wherein the electric power steering system comprises a first control subsystem and a second control subsystem, the method comprises:

acquiring a front steering angle, a steering torque, a yaw rate, and a vehicle speed of a vehicle;

determining a vehicle yaw rate associated with the first control subsystem according to the front steering angle, the steering torque, the yaw rate, and the vehicle speed;

determining an expected deviation value associated with the second control subsystem on the basis of the vehicle yaw rate; and determining a control parameter on the basis of the expected deviation value such that the vehicle adjusts the steering torque to run according to the control parameter;

wherein determining the control parameter on the basis of the expected deviation value such that the vehicle adjusts the steering torque to drive according to the control parameter comprises:

when the expected deviation value is within a first preset range, determining a steering angle feedforward control parameter such that the vehicle runs by adjusting the steering torque according to the steering angle feedforward control parameter.

2. The method according to claim 1, wherein determining the control parameter on the basis of the expected deviation value such that the vehicle adjusts the steering torque to run according to the control parameter comprises:

when the expected deviation value is within a second preset range, determining a steering angle feedback control parameter such that the vehicle runs by adjusting the steering torque according to the steering angle feedback control parameter.

3. The method according to claim 2, wherein when the expected deviation value is within the second preset range, determining the steering angle feedback control parameter to cause the vehicle to run by adjusting the steering torque according to the steering angle feedback control parameter comprises:

acquiring a proportional derivative gain of a proportional-derivative function when the expected deviation value is within the second preset range; and determining a steering angle feedback control parameter based on the proportional derivative gain such that the vehicle runs by adjusting the steering torque according to the steering angle feedback control parameter.

4. The method according to claim 1, wherein when the expected deviation value is within the first preset range, determining the steering angle feedforward control parameter such that the vehicle runs by adjusting the steering torque according to the steering angle feedforward control parameter comprises:

acquiring a proportional gain of a proportional gain function when the expected deviation value is within the first preset range; and determining the steering angle feedforward control parameter based on a product of the proportional gain and the steering torque such that the vehicle runs by adjusting the steering torque according to the steering angle feedforward control parameter.

5. A computer-readable medium, wherein the computer-readable medium stores a computer-readable code, and when the computer-readable code is executed, the control method according to claim 1 is performed.

6. A control apparatus, wherein the apparatus is applied to a vehicle provided with an electric power steering system, wherein the electric power steering system comprises a first control subsystem and a second control subsystem, the apparatus comprises:

one or more processors and a storage device; and the storage device stores a computer program which, when executed by the processor, performs the operations comprising:

acquiring a front steering angle, a steering torque, a yaw rate, and a vehicle speed of the vehicle;

determining a vehicle yaw rate associated with the first control subsystem according to the front steering angle, the steering torque, the yaw rate, and the vehicle speed;

determining an expected deviation value associated with the second control subsystem on the basis of the vehicle yaw rate; and determining a control parameter on the basis of the expected deviation value such that the vehicle adjusts the steering torque to run according to the control parameter;

wherein the operations of the apparatus comprise:

when the expected deviation value is within a first preset range, determining a steering angle feedforward control parameter such that the vehicle runs by adjusting the steering torque according to the steering angle feedforward control parameter.

7. The apparatus according to claim 6, wherein the operations of the apparatus comprise when the expected deviation value is within a second preset range, determining a steering angle feedback control parameter such that the vehicle runs by adjusting the steering torque according to the steering angle feedback control parameter.

8. The apparatus according to claim 7, wherein the operations of the apparatus comprise acquiring a proportional derivative gain of a proportional-derivative function when the expected deviation value is within a second preset range; and determining a steering angle feedback control parameter based on the proportional derivative gain such that the vehicle runs by adjusting the steering torque according to the steering angle feedback control parameter.

9. The apparatus according to claim 6, wherein the operations of the apparatus comprise acquiring a proportional gain of a proportional gain function when an expected deviation value is within the first preset range; and determining the steering angle feedforward control parameter according to a product of the proportional gain and the steering torque.

10. A vehicle comprising an electric power steering system and the control apparatus according to claim 6.

11. The vehicle according to claim 10, wherein the vehicle further comprises a controller;

wherein the controller is configured for a steering torque overlay system provided with a feedforward control and a feedback control, wherein the feedforward control and the feedback control are used to control an angle of a front wheel of the vehicle to restore stability of the vehicle.

* * * * *